United States Patent [19]

Bauer

[11] Patent Number: 5,534,556
[45] Date of Patent: Jul. 9, 1996

[54] PROCESS FOR THE SEPARATION AND REUTILIZATION OF FABRIC MATERIALS FROM POLYURETHANE ADHESIVE BONDED COMPOSITE LAMINATES

[76] Inventor: Gunther Bauer, Krähenfeldstr. 18, 73434 Dewangen, Germany

[21] Appl. No.: 275,208

[22] Filed: Jul. 14, 1994

[30] Foreign Application Priority Data

Jul. 14, 1993 [DE] Germany .................. 43 23 558.1

[51] Int. Cl.⁶ .................. C08J 11/04; C08J 11/24
[52] U.S. Cl. .................. 521/49; 521/49.5; 521/167; 528/495; 528/502; 428/903.3; 428/903; 428/224; 428/235; 428/239; 428/284; 428/289; 428/423.1
[58] Field of Search .................. 521/49, 49.5, 167; 528/495, 502; 428/903.3, 224, 235, 239, 284, 289, 423.1, 903, 284

[56] References Cited

U.S. PATENT DOCUMENTS

| | | | |
|---|---|---|---|
| 3,632,530 | 6/1972 | Kinoshite | 521/49.5 |
| 3,738,946 | 6/1973 | Frulle | 521/49.5 |
| 3,954,681 | 5/1976 | Castle | 521/49 |
| 3,983,087 | 9/1976 | Tucker et al. | 521/49.5 |
| 4,110,266 | 8/1978 | Sheratte | 260/2.3 |
| 4,159,972 | 7/1979 | Braslaw et al. | 521/49.5 |
| 4,267,078 | 5/1981 | Lidy et al. | 521/49 |
| 4,317,939 | 3/1982 | Gerlock et al. | 521/49.5 |
| 4,339,358 | 7/1982 | Schutz | 521/49 |
| 5,338,763 | 8/1994 | Munzamy et al. | 521/49 |
| 5,414,021 | 5/1995 | Eddy | 521/40 |

FOREIGN PATENT DOCUMENTS

| | | |
|---|---|---|
| 546415 | 11/1989 | European Pat. Off. . |
| 547249 | 7/1992 | European Pat. Off. . |
| 537579 | 10/1992 | European Pat. Off. . |
| 2362921 | 7/1974 | Germany . |
| 2514471 | 10/1975 | Germany . |
| 2516863 | 10/1975 | Germany . |
| 123915 | 1/1977 | Germany . |
| 127493 | 9/1977 | Germany . |
| 2738572 | 3/1979 | Germany . |
| 138472 | 11/1979 | Germany . |
| 3131203 | 4/1982 | Germany . |
| 3435014 | 3/1986 | Germany . |
| 3820597 | 12/1989 | Germany . |
| 3936063 | 10/1990 | Germany . |
| 298250 | 2/1992 | Germany . |
| 61-22836 | 9/1981 | Japan .................. 521/49 |

OTHER PUBLICATIONS 3.8 Alcoholysis—Chemical Recycling Process for Polyurethanes and Mixed Plastic Wastes—Gunter Bauer.

*Primary Examiner*—Paul R. Michl
*Assistant Examiner*—Olga Asinovsky
*Attorney, Agent, or Firm*—Gary A. Samuels

[57] ABSTRACT

A process for the separation of laminated components from polyurethane adhesive bonded composite laminates is provided. In this process, the laminates are treated with monofunctional aliphatic alcohols with 3 to 12 carbon atoms or mixtures thereof at temperatures of 100° C. to 200° C. to alcoholize the polyurethane. If necessary, water is added to the process. The alcoholysis product is removed and the components are separated from each other. This process is particularly useful in separating fabric components from expanded porous polytetrafluoroethylene membrane.

12 Claims, No Drawings

PROCESS FOR THE SEPARATION AND REUTILIZATION OF FABRIC MATERIALS FROM POLYURETHANE ADHESIVE BONDED COMPOSITE LAMINATES

FIELD OF THE INVENTION

The invention relates to a process for the separation of components from composite fabric laminates.

BACKGROUND OF THE INVENTION

Composite laminates are generally made from high-quality starting fabrics. The fabrics are frequently bonded with polyurethane adhesives to produce a laminate.

Polytetrafluoroethylene materials, in particular expanded porous PTFE-membranes, are used in a wide variety of applications in the fabric processing industry. Among others, they are used in composite laminates with conventional textiles, such as polyesters and polyamides, as well as other fabrics and are bonded together by means of a polyurethane adhesive.

As is well known, PTFE is a high-quality product. Therefore it is desirable to reutilize laminates containing high-quality fabrics with PTFE. For this purpose such laminates need to be separated into their pure individual components.

The polyurethane (PUR) adhesives used for lamination are cross-linked and do therefore not react to conventional physical separation methods. Therefore an automatic separation of the laminate can only be achieved if the PUR-layer is chemically degraded and made soluble to such an extent that it is fully released from the fabric or from the fabric and the PTFE layer.

The state of the art includes methods for dissolving cross-linked PTFE. Such methods are described in DE-OS 2362921, DE-OS 2516863 and DE-PS 2738572; the PUR is degraded by means of hydrolysis with water or alcoholysis with bivalent or multivalent alcohols at temperatures around 200° C. Thus viscous polyol-like substances are produced from which PUR can again be synthesized.

As known from DE-OS 2514471 or DE-OS 3131203, polyester can be degraded into low-molecular, soluble or liquid products in this way and under similar reaction conditions. Polyamides, too, are; degradable at temperatures above 200° C. with agents containing hydroxyl-groups, as explained in DD-PS 138472. DD-PS 123915, DD-PS 138472 or DE-OS 3435014 describe the degradation of polyesters, polyamides and polyurethanes, either together or stepwise, into liquid or soluble products.

If these processes were applied to PTFE-laminates, the PTFE-membrane would have to be separated from the product of a viscous polyol-like liquid after the decomposition reaction. This is very complicated because the comparatively smaller quantity of the PTFE-constituent would have to be separated from adhering polyol and cleaned by means of solvents.

There is a need for a process by means which the PTFE-membrane can be separated from the laminated fabric without destroying the components.

SUMMARY OF THE INVENTION

A process is provided for separating individual laminated components from laminates bonded together by polyurethane comprising (a) treating the laminate with a solution containing a monofunctional aliphatic alcohol selected from the group having from 3 to 12 carbon atoms and mixtures thereof in the presence of water, at temperatures in the range from 100° C. to 200° C.; (b) forming an alcoholysate with the polyurethane; and (c) physically separating the alcoholysate from the individual components. The process is particularly suitable when one of the components is PTFE. The process may also operate at a temperature of between 120° C. and 180° C. under normal pressure. The treating step may include use of alcohol which may be renewed continuously or in batches. The process may contain an additional step of condensing and extracting the alcohol. The heat energy generated from any alcohol distillation process may further be utilized for heat in further processing.

The alcohol utilized in this delamination process may further be supplied with diols and polyols in amounts sufficient to correspond to the polyurethane content used in the adhesive bonding the components. A final step in the delamination process may also include removal of any remaining alcohol with water or water vapor from the individual components. The process may also include use of mechanical means such as a mechanical flotation or air classification to separate the components.

The distillation residue obtained from this process may be used as a raw material in the manufacture of polyurethane.

DETAILED DESCRIPTION OF THE INVENTION

This invention provides for a process of separating the individual components of a laminate. The process is particularly suitable for laminates having at least one component comprised of expanded porous PTFE membrane. The other component is a fabric material and may include textiles such as woven and knitted materials as well as nonwoven materials.

Surprisingly, it was detected that the application of monofunctional alcohols at temperatures between 100° C. and 200° C. made the components of the laminate separate completely and easily while cleaning the PTFE-membrane. This finding was unexpected because conventional technology showed a quick and complete degradation of polyurethane was not possible at temperatures under 180° C.; it was believed that a temperature of 200° C. was needed and the presence of catalysts was required. It was equally surprising that neither textiles such as polyester nor polyamides were noticeably attacked and degraded by this treatment by the monofunctional alcohols. According to the state of the art these polyester and polyamide polymers are alcoholyzed and degraded in the same way as polyurethanes, even if the degradation time varies.

This alcoholysis process with monofunctional alcohols at relatively low temperatures opens up new perspectives for the reutilization of laminated composite materials because all the materials used can be separated, cleaned, and fed back into the material cycle for a specific application. Thus this process combines a chemical separation process with a chemical cleaning process to obtain pure, separable materials.

According to the invention, monofunctional aliphatic alcohols with 3 to 12 carbon atoms or mixtures thereof are suitable for a selective PUR-degradation. The following alcohols from these groups include but are not limited to:

n-butanol, s-butanol, isobutanol, n-pentanol, 2-methyl butanol, 3-methyl butanol, cyclopentanol, n-hexanol and isomers, cyclohexanol, heptanol isomers, octanol isomers, 2-ethylhexanol, decanol, dodecanol.

Higher alcohols are mostly present in the form of mixtures (of isomers). Since these are technically important and inexpensive products, they are suitable reagents for the invention. Furthermore, aliphatic ether alcohols are also suitable and include but are not limited to:

ethylene glycol mono-methyl ether
ethylene glycol mono-ethyl ether
ethylene glycol mono-propyl ether
ethylene glycol mono-butyl ether The alcoholysis reaction may be accelerated by adding alkaline or acidic catalysts, such as alkaline (earth) hydroxides or alkoxides, amines, titanates, stannates or protonic acids.

Since the boiling points of the aliphatic monofunctional alcohols are higher than the required reaction temperatures, the separation operation ensues without pressure. This is a considerable process benefit.

Another unexpected process benefit is that the conversion of polyurethane to an alcoholizate at the boiling points of the alcohols used, which lie between 120° C. and 180° C., eases as ,desired and with sufficient speed. It may be advantageous to add a suitable quantity of water to the alcohol according to its azeotropic composition., In this way boiling points can be set to a desired temperature.

The process is performed such that either complete fabrics and garments are treated directly or after an initial separation or shredding process. The separation and cleaning process is not influenced by the type and pre-treatment of the laminated fabric. The latter merely determines the post-treatment after the chemical process. The process involves placing the fabrics in a container and treating them either continuously or in batches with fresh alcohol at or slightly below the boiling temperature of the alcohol. Depending on the alcohol used, the process takes between 1 and 6 hours to fully degrade the PUR-adhesive, release it from the PTFE-membrane or fabric material and remove it with the alcohol flow.

Mechanical agitation of the container content is advantageous to support the physical and chemical dissolution process. This may be accomplished by, for example, stirring, compression followed by release, vibration, steam or gas pressure pulses.

The alcohol mixture containing the dissolved substances may be removed from the container either continuously or in batches and supplied to a distillation apparatus. There the alcohol or the alcohol mixture is distilled without pressure and fed back to the solution container either directly in steam form or after a condensation process. The advantage of a transfer in steam form is that the steam may also be utilized as an internal container heating by making use of the condensation heat.

Alternatively, the container may be charged in batches when an interim condensation step is included. This saves solvent and makes the cleaning process more effective.

The following methods are within the scope of this invention:

(a) The laminated materials are placed in a container and are continuously extracted and washed through sieve plates in the form of an extraction column using solvent vapor and condensed solvent either statically or dynamically. The reaction temperature approximately corresponds to the boiling temperature of the alcohol or alcohol mixture. By appropriately adjusting the boiling temperature by mixtures, such as by adding water (azeotropes), this process is technically simple and can be performed without sophisticated control and measuring technology. The back-distillation and separation of the alcohol mixture is accomplished either directly integrated in the container or externally in a distillation apparatus. After the reaction has been completed, the alcohol circle is interrupted and the residual alcohol in the textile is azeotropically extracted with water or water vapor, condensed and fed back into the process. The moist, separated components may be removed from the container either moist with water or when dry.

(b) The laminated materials are placed in a container, heated with the alcohol (mixture) to a temperature between 120° C. and 180° C. under mechanical agitation and the alcohol (mixture) is removed either continuously at a controlled level or in certain time intervals and fed to a distillation apparatus. The redistilled alcohol (mixture) is again supplied to the container, either continuously or in certain time intervals. After a defined treatment time and after the alcohol mixture has been removed, the residue is mixed with water and evaporated at temperatures of 120° C. and 180° C. together with remaining alcohol (mixture). The remaining aqueous bath may be further utilized, such as with addition of cleaning agents and detergents as a further cleaning step for the individual components. After removing the washing bath and optional drying, the components may be removed and subjected to a separation process.

The subsequent separation of the delaminated components which have been treated according to one of the two methods depends on the form in which the components have been supplied to the delamination process.

If the components have been previously separated, freed from seams and connection parts and shredded, the separation process ensues directly afterwards or is integrated in the delamination stage in such a way that the components are separated by a process of sinking and floating when still moist with water or in an aqueous bath. This method makes use of the substantially different wetting behavior of the components and may be effected by the presence of surface active agents. This allows for a separation by flotation directly in the aqueous solution.

Another way of processing the delaminated components is to combine the drying process of the still moist fabrics mixture with a separation process. This process is advantageous if pre-cut pieces with an edge length of less than about 100 mm are used.

In this case, an air classifier (machine which separates components by use of centrifugal forces) is operated by use of an air stream, which may also be heated, is charged with the moist materials to be separated. Suitable air classifiers include linear types, but also various special types of increased separation efficiency. The separation is based on the different buoyancy rates of the individual components.

Another suitable separation process for the delaminated materials is to manually sort the dried, still water-moist, materials and mechanically separate pieces which are still connected by seams. This process is preferable if whole garments or garments which are only partly undone or industrial laminates such as non-garments and filtration laminates are to be separated.

The primary focus of pure material retrieval by such a process is on PTFE, which is fed back into the material cycle due to its high material value. However, it is only economical if the degree of purity of the recuperated PTFE is satisfactory. The decisive criterium is the content of organic hydrocarbon compounds as quantified by infrared spectroscopic measurements.

When the inventive process is used, the organic hydrocarbon contents obtained are so low that the recuperated PTFE can be directly fed back into the material cycle by conventional methods.

The back-distillation and closed alcohol circuit produces a concentrated, extract from the delamination process which collects in the distillation sump and mainly consists of alcoholized polyurethane. The recuperated polyurethane present in the residues is not suitable for a direct reutilization for the production of polyurethanes because the conversion with isocyanates prevents the formation of utilizable polymer products.

The addition of diols or polyols to alcohol, either directly in the delamination process or in the distillation apparatus after the completed distillation of the monofunctional alcohol, has surprisingly turned out to make available polyol-like viscous liquids which form suitable secondary raw materials for polyurethane production.

The benefit of the process is that the distillation residue from the separation process can be converted into a polyurethane raw material without the need for additional apparatus, staff and energy. The product can be easily modified such that it is suitable for a defined application in the polyurethane market. This is achieved in that the required amount of diol and/or polyol is added at any time and in any time interval during the delamination process to impart the optimal properties to an expected quantity of distillation residue. The desired application for the polyol thus obtained is decisive. If hard polyurethanes, such as insulation foams, are to be produced, higher functional polyols of lower molar masses are added in addition to diolens, such as ethylene glycol, diethylene glycol, propylene glycol, dipropylene glycol or butandiol. To produce soft to semi-solid polyurethanes, long-chained polyether polyols may be added in addition to short and/or long-chained ether dioles.

Due to the good material compatibilities, homogenous or dispersed polyol mixtures are obtained after the monofunctional alcohol has been almost completely removed.

EXAMPLES

Comparative Example

PUR bonded polyamide polyethylene terephtalate PTFE laminates were coated with a sufficient amount of ethylene glycol such that the textile material was fully covered by the liquid. The mixture was slowly stirred and heated to 170° C. and was kept at this temperature for 5 hours. After cooling down, a pasty mass was obtained which was insoluble in usual solvents and contained both the PTFE-membrane and some non-dissolved polyester textile materials.

The PTFE could not be isolated by conventional separation processes.

Under the same conditions butane diol, instead of ethylene glycol, was heated to a temperature of 180° C. for 4 hours. Again a pasty to solid mass was obtained which could not be further processed.

Example 1

A three-layer laminate which was shredded as in the comparative example, was filled into a pipe and in the form of a column was permeated by a flow of vaporous ethyl hexanol from the bottom upwards. The ethyl hexanol condensed in a coller above the column, flowed back and continuously extracted the laminate at the boiling temperature of the alcohol. The laminate-filled column was then permeated by water vapor in order to drive out any remaining ethyl hexanol by water vapor distillation for subsequent condensation and supply to the next batch. The water-moist, delaminated material was immersed in a water bath and the PTFE-membrane was separated from the textile by flotation with the addition of surfactants.

Example 2

Non-treated, non-shredded 3-layer laminates were put in a 20 liter stirring vessel and heated with n-butanol vapor from an external distillation apparatus while stirring discontinuously. The condensing and PUR-dissolving butanol was continuously supplied to the distillation apparatus at a controlled level, was evaporated and fed back to the stirred vessel. After two process hours, excess butanol was removed from the container and the stirring vessel was supplied with water vapor until the distillate evaporated from the container and condensed contained no more butanol. The butanol separating from the water in a second phase was supplied to a subsequent process. The moist components were dried and the PTFE was manually freed from seams and textiles. An infrared spectroscopy analysis of the PTFE-membrane showed only a slight intensity of the hydrocarbon bands.

Example 3

The butanol-containing residue in the distillation apparatus from test 2 was mixed with equal shares of dipropyleneglycol and a short-chained polyethertriol in an amount corresponding approximately to the PUR-adhesive contained in the laminate. After complete removal of the butanol, finally at a temperature of about 180° C., a viscous dark-colored mass was obtained, with a hydroxyl number of 450 mg KOH/g. After conversion with stochiometric amounts of methylenediphenyldiisocyanate, a hard polyurethane was obtained.

I claim:

1. A process for separating the fabric components of a fabric laminate in which the fabric components have been laminated together by a polyurethane adhesive, consisting of the steps of:
   (a) treating the laminate with a monofunctional aliphatic alcohol containing from between 3 to 12 carbon atoms or mixtures thereof at temperatures of 160° C. to 200° C., whereby the alcohol reacts with the polyurethane to form an alcoholisate;
   (b) separating the alcoholisate from fabric components that do not form alcoholisates under the conditions of step (a); and
   (c) separating the fabric components from one another.

2. The process of claim 1 wherein in step a water is present.

3. The process of claim 1 wherein one of the fabric components is expanded porous PTFE membrane, and in step (c) the expanded porous PTFE is separated from the other fabric components.

4. The process of claim 1 wherein the forming of an alcoholisate is effected at around the boiling point of the alcohol which is between 120° C. and 180° C. under normal pressure.

5. The process of claim 1 wherein the step of forming the alcoholisate is effected dynamically in a liquid alcohol phase while the alcohol is renewed continuously.

6. The process of claim 1 wherein the step of forming the alcoholisate is effected dynamically in aligned alcohol phase while the alcohol is renewed in batches.

7. The process of claim 1 wherein alcoholisate is separated in a condensing alcohol stream.

8. The process of claim 1 wherein the alcohol is recycled by a distillation step and heat energy generated from the distillation step is used for the heating in step a).

9. The process of claim 1 wherein the monofunctional alcohol is supplied with a material selected from the group consisting of diols, and polyols, and in quantities which correspond approximately to the amount of polyurethane adhesive used for bonding the fabrics of the laminate.

10. The process of claim 1 further comprising the step of removing any remaining alcohol with water or water vapor and recovering the alcohol by condensation.

11. The process of claim 1 wherein the separating step (d) is effected by physical means selected from the group consisting of mechanical flotation and air classification.

12. The process of claim 1 wherein the fabric is a laminate of at least one textile layer and one layer of expanded porous PTFE membrane, and in step (c) textile layers are separate from PTFE membrane layers.

* * * * *